Figure 4:
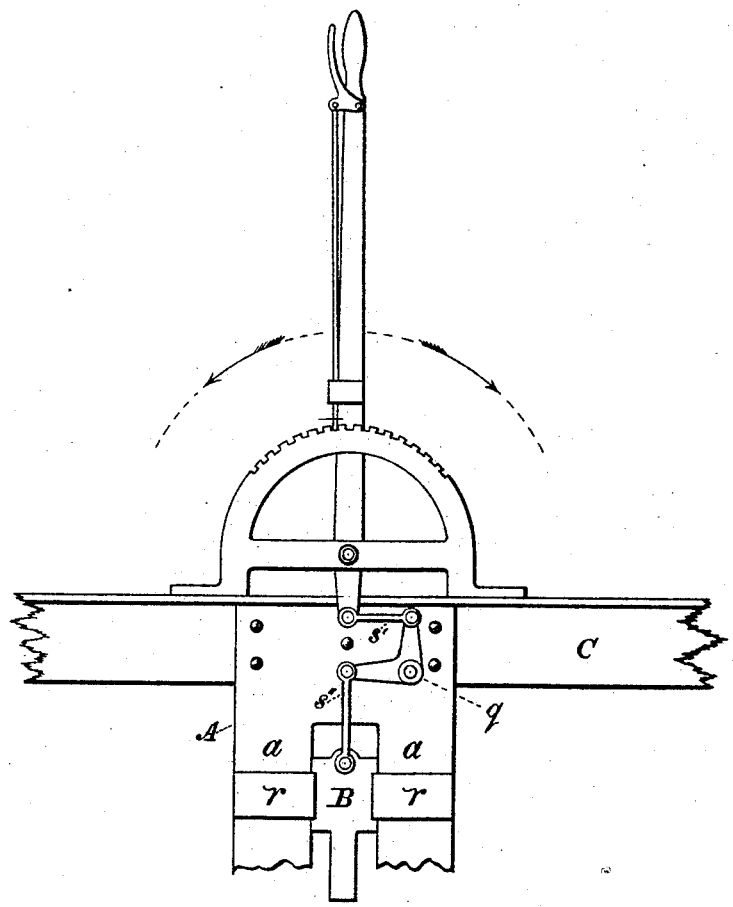

(No Model.)  2 Sheets—Sheet 1.
W. EMBLEY.
GRIPPING DEVICE FOR CABLE RAILWAYS.
No. 362,067.  Patented May 3, 1887.
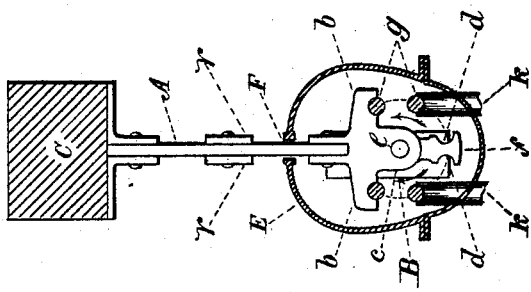
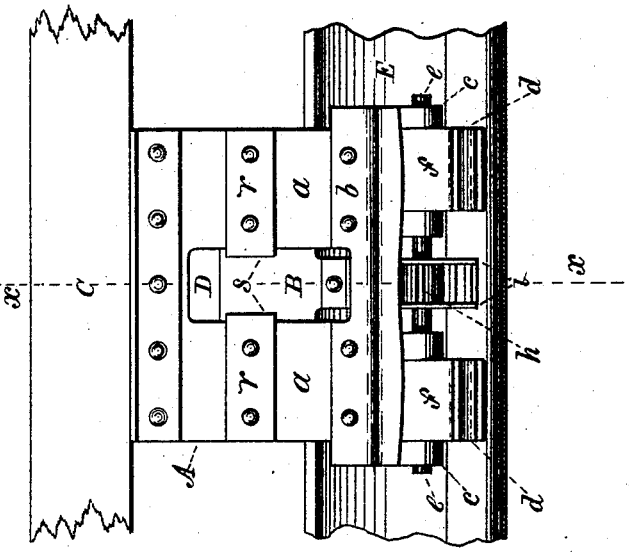
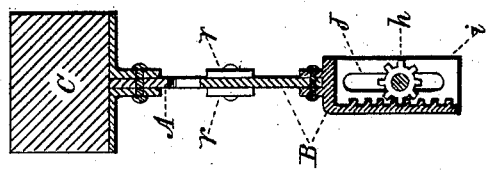
WITNESSES.  INVENTOR.
R. Newton.  William Embley.
A. H. Newton.  By F. S. Davenport, Atty.

(No Model.)  2 Sheets—Sheet 2.
W. EMBLEY.
GRIPPING DEVICE FOR CABLE RAILWAYS.
No. 362,067. Patented May 3, 1887.

WITNESSES.
A. W. Newton.
H. B. Cory.

INVENTOR.
William Embley.
By F. S. Davenport, Atty.

UNITED STATES PATENT OFFICE.

WILLIAM EMBLEY, OF JERSEYVILLE, ILLINOIS.

GRIPPING DEVICE FOR CABLE RAILWAYS.

SPECIFICATION forming part of Letters Patent No. 362,067, dated May 3, 1887.

Application filed September 6, 1886. Serial No. 212,852. (No model.)

*To all whom it may concern:*

Be it known that I, WILLIAM EMBLEY, of Jerseyville, in the county of Jersey and State of Illinois, have invented a new and Improved Gripping Device for Cable Railways; and I do hereby declare that the following is a full and exact description of the same, reference being had to the accompanying drawings, and to the letters of reference marked thereon.

My invention consists of an improved gripping device for connecting the cars of cable railways with the propelling-cable, and is designed, chiefly, for street-railways operated by an endless cable, my object being to provide a gripper of simple construction adapted for a cable-tube of small diameter, and capable of picking up and clutching the cable, whether the latter be on the right or left of the arm by which the gripper depends from the car. The contrivance by which I accomplish this end is fully explained in the following specification, and illustrated in the accompanying drawings, in which—

Figure 1 is a side view of the gripping device, of which Fig. 2 is an end elevation. Fig. 3 is a transverse sectional view taken in the line $x$ $x$, Fig. 1; and Fig 4 is a side elevation of the actuating mechanism.

Referring to the drawings, A represents the grip-arm, consisting of a broad plate of iron or steel secured to and depending from the bottom of the car, one of the timbers of which is represented at C, said grip-arm having an opening, D, which divides vertically the main length of the arm into two parts, $a$ $a$, which latter are connected together by two fixed grip-jaws, $b$ $b$, bolted, one on each side of the grip-arm, at a point inside the cable-tube E and a little below the slot F, in which the grip-arm travels. The lower extremities, $a$ $a$, of the grip-arm are provided with bearings $c$, in which is journaled an arbor, $e$, near each end of which is secured thereon a grip-jaw, $f$, adapted to swing or vibrate in a plane transverse to the cable $g$, and provided on each side with a groove or channel, $d$, longitudinally parallel to the cable, and so distanced from the axis of vibration that when the said movable jaws are turned up the channels referred to shall coincide with similar channels in the fixed jaws $b$, as shown in dotted lines, Fig. 2.

For the purpose of actuating the movable jaws, the opening D in the grip-arm is occupied by a vertically-sliding rack, B, (shown in Figs. 1, 3, and 4,) which engages with a pinion, $h$, rigidly keyed upon the arbor $e$, said rack being provided with flanges $i$, having slots J, Fig. 3, adapted to include the arbor $e$, which thus fills the office of a guide for the lower part of the rack, the upper part of which slides vertically between the inner edges of the opening D in the grip-arm and the overlapping edges $s$ of the plates $r$, which latter are secured to each side of the grip-arm, as shown in the drawings.

In order to increase the tenacity of the grip upon the cable, both the movable and fixed jaws with which the cable is clamped are slightly curved longitudinally, as shown in Fig. 1.

In regard to the mechanism by which motion is transmitted from the platform or other part of the car to the vertically-sliding rack, it is obvious that almost any of the numerous contrivances employed for similar purposes would be available, the choice depending mainly upon the structure of the car.

The mechanism shown in Fig. 4 and located in the central part of the grip-car is by preference employed. This consists of an ordinary latch-lever connected with the sliding rack B by a bent lever, $q$, one end of which is connected with the latch-lever by a link, $s'$, and the other with the rack B by a link, $s''$.

Matters being thus, when it is required to grip the cable on the right, as shown in dotted lines, Fig. 2, the sliding rack is thrust downward. This motion throws the movable jaws up, which in their course, as indicated by the dotted circular arc, pick up the cable from the carrier-wheels $k$, and, lifting it to the channels in the fixed jaws, there clamp it with the force requisite for the propulsion of the car. In order to grip the cable on the opposite side of the grip-arm the motion of the rack is simply reversed—drawn upward. To stop the car, the rack is placed at mid-stroke. The movable jaws then hang in a vertical position, as shown in Fig. 2.

Having fully described my invention, what I claim as new, and desire to secure by Letters Patent, is—

1. In a gripping device for cable railways, the combination, with fixed arms provided with fixed jaws and depending from the bottom of the car, of bearings secured to the lower ends of said arms for the reception of the arbor upon which the vibrating grip-jaws are mounted, so as to preserve said arbor at a constant distance from the bottom of the car.

2. The combination, with the grip-arm having fixed jaws secured to each side thereof, and an arbor journaled at the lower extremity, carrying movable jaws adapted to vibrate in planes transverse to the cable, so as to clamp the latter to the fixed jaws, as herein described, of a pinion secured upon said arbor, and adapted to engage with a vertically-sliding rack retained in position relative to the pinion by slots the sides of which slide vertically against the arbor upon which are secured the movable jaws, said slots being located in flanges at the sides of the rack the upper part of which is adapted to slide in a guide consisting of the inner edges of the opening in the grip-arm, and plates secured to the sides thereof, all constructed and adapted to operate substantially as and for the purpose set forth.

In testimony that I claim the foregoing I have hereunto set my hand this 11th day of August, 1886.

WILLIAM EMBLEY.

Witnesses:
R. NEWTON,
H. D. STELLE.